US008112751B2

(12) United States Patent
Leijen et al.

(10) Patent No.: US 8,112,751 B2
(45) Date of Patent: Feb. 7, 2012

(54) EXECUTING TASKS THROUGH MULTIPLE PROCESSORS THAT PROCESS DIFFERENT PORTIONS OF A REPLICABLE TASK

(75) Inventors: Daniel J. P. Leijen, Bellevue, WA (US); Wolfram Schulte, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 296 days.

(21) Appl. No.: 12/065,556

(22) PCT Filed: Mar. 1, 2008

(86) PCT No.: PCT/US2008/055583
§ 371 (c)(1), (2), (4) Date: Mar. 3, 2008

(87) PCT Pub. No.: WO2008/118613
PCT Pub. Date: Oct. 2, 2008

(65) Prior Publication Data
US 2010/0269110 A1 Oct. 21, 2010

Related U.S. Application Data

(60) Provisional application No. 60/892,415, filed on Mar. 1, 2007.

(51) Int. Cl.
*G06F 9/46* (2006.01)
(52) U.S. Cl. ........................ 718/100
(58) Field of Classification Search .......... None
See application file for complete search history.

(56) References Cited

U.S. PATENT DOCUMENTS

| 4,636,948 | A | * | 1/1987 | Gdaniec et al. | 718/106 |
|---|---|---|---|---|---|
| 5,418,916 | A | * | 5/1995 | Hall et al. | 712/228 |
| 5,535,393 | A | * | 7/1996 | Reeve et al. | 717/149 |
| 6,016,397 | A | | 1/2000 | Ogasawara et al. | |
| 6,088,044 | A | * | 7/2000 | Kwok et al. | 345/505 |
| 6,112,225 | A | * | 8/2000 | Kraft et al. | 709/202 |
| 6,282,704 | B1 | | 8/2001 | Iitsuka | |
| 6,463,527 | B1 | | 10/2002 | Vishkin | |
| 6,604,122 | B1 | * | 8/2003 | Nilsson | 718/100 |
| 6,681,388 | B1 | | 1/2004 | Sato et al. | |
| 6,711,607 | B1 | | 3/2004 | Goyal | |

(Continued)

OTHER PUBLICATIONS

Leijen et al. (The Design of a Task Parallel Library); Proceeding—OOPSLA '09 Proceeding of the 24th ACM SIGPLAN conference on Object oriented programming systems languages and applications; pp. 227-241.*

(Continued)

*Primary Examiner* — Keith Vicary
(74) *Attorney, Agent, or Firm* — Workman Nydegger

(57) ABSTRACT

A developer can declare one or more tasks as being replicable. A library manages all tasks that are accessed by an application, including replicable tasks, and further establishes a task manager during requested task execution. During execution, the library generates a plurality of worker threads, and each of the worker threads is assigned to be processed on one of a plurality of different central processing units. When one or more worker threads have finished processing assigned tasks, and other threads are still busy processing other tasks, the one or more idle worker threads copy over and process replicable tasks assigned to the other, busier worker thread(s) to help with processing. The system can also synchronize processing of the replicable task by the plurality of different worker threads and different processors to ensure no processing discrepancies.

14 Claims, 4 Drawing Sheets

U.S. PATENT DOCUMENTS

| | | | | |
|---|---|---|---|---|
| 6,711,616 | B1* | 3/2004 | Stamm et al. | 709/226 |
| 6,826,753 | B1* | 11/2004 | Dageville et al. | 718/102 |
| 6,944,754 | B2 | 9/2005 | Zilles et al. | |
| 7,016,923 | B2* | 3/2006 | Garthwaite et al. | 1/1 |
| 7,076,777 | B2 | 7/2006 | Srinivasan | |
| 7,089,545 | B2 | 8/2006 | Bera | |
| 7,171,544 | B2 | 1/2007 | Bera | |
| 7,174,381 | B2 | 2/2007 | Gulko et al. | |
| 7,565,651 | B1* | 7/2009 | Carey | 718/100 |
| 7,614,053 | B2* | 11/2009 | Inoue et al. | 718/100 |
| 7,730,119 | B2* | 6/2010 | Bates et al. | 709/201 |
| 7,945,911 | B1* | 5/2011 | Garthwaite | 718/102 |
| 2003/0005025 | A1* | 1/2003 | Shavit et al. | 709/102 |
| 2003/0097395 | A1 | 5/2003 | Petersen | |
| 2003/0214660 | A1* | 11/2003 | Plass et al. | 358/1.9 |
| 2004/0088702 | A1* | 5/2004 | Garthwaite et al. | 718/100 |
| 2004/0088711 | A1 | 5/2004 | Alverson et al. | |
| 2005/0125793 | A1* | 6/2005 | Aguilar et al. | 718/100 |
| 2005/0188364 | A1 | 8/2005 | Cockx et al. | |
| 2006/0048119 | A1 | 3/2006 | Ren et al. | |
| 2007/0022412 | A1 | 1/2007 | Tirumalai et al. | |
| 2007/0033592 | A1 | 2/2007 | Roediger et al. | |
| 2008/0244588 | A1* | 10/2008 | Leiserson et al. | 718/102 |
| 2009/0077561 | A1* | 3/2009 | Feng et al. | 718/104 |
| 2009/0240890 | A1* | 9/2009 | Collard et al. | 711/125 |
| 2009/0288086 | A1* | 11/2009 | Ringseth et al. | 718/102 |

OTHER PUBLICATIONS

Leijen et al. (Parallel Performance: Optimize Managed Code for Multi-Core Machines); MSDN Magazine, Oct. 2007, 12 pages.*

Frigo et al. (The Implementation of the Cilk-5 Multithreaded Language); In Proceedings of the ACM SIGPLAN '98 Conference on Programming Language Design and Implementation, pp. 212-223, Montreal, Quebec, Canada, Jun. 1998. Proceedings published ACM SIGPLAN Notices, vol. 33, No. 5, May 1998.*

"Automatic Loop Parallelization: An Abstract Interpretation Approach," by Laura Ricci, University of Pisa, Copyright IEEE, Inc. 2002, 2 pgs. [online] [retrieved on Mar. 2, 2007]. Retrieved from the Internet: http://csdl2.computer.org/persagen/DLAbsToc.jsp?resourcePath=/dl/proceedings/&toc=comp/proceedings/paralec/2002/1730/00/1730toc.xml&DOI=10.1109/PCEE.2002.1115214.

"Optimal Loop Parallelization," by Alexander Aiken and Alexandru Nicolau, Computer Science Department, Cornell University, Proceedings of the SIGPLAN '88 Conference on Programming Language Design and Implementation, 1988, [online] [retrieved on Mar. 2, 2007], p. 308-317. Retrieved from the Internet: http://delivery.acm.org/10.1145/60000/54021/p308-aiken.pdf?key1=54021&key2=0838272711&coll=GUIDE&dl=GUIDE&CFID=12423195&CFTOKEN=85378591.

"Semantic-Driven Parallelization of Loops Operating on User-Defined Containers," by Dan Quinlan, Markus Schordan, Qing Yi, and Bronis R. de Supinski, Lawrence Livermore National Laboratory, date unknown, [online] [retrieved on Mar. 2, 2007], pp. 1-15. Retrieved from the Internet: http://parasol.tamu.edu/lcpc03/informal-proceedings/Papers/26.pdf.

* cited by examiner

EXECUTING TASKS THROUGH MULTIPLE PROCESSORS THAT PROCESS DIFFERENT PORTIONS OF A REPLICABLE TASK

CROSS-REFERENCE TO RELATED APPLICATIONS

This application claims priority to, and is a 35 U.S.C. §371 U.S. National Stage Application of, PCT Application No. PCT/US08/55583, filed on Mar. 1, 2008, entitled "Executing Tasks Through Multiple Processors Consistently with Dynamic Assignments." The present invention also claims the benefit of priority to U.S. Provisional Patent Application No. 60/892,415, filed on Mar. 1, 2007, entitled "Replicable Tasks for Dynamic Distribution of Parallel Tasks." The entire content of each of the aforementioned applications is incorporated herein by reference.

BACKGROUND

Background and Relevant Art

As computerized systems have increased in popularity, so have the complexity of the software and hardware employed within such systems. In general, there are a number of reasons that drive software and hardware changes for computerized systems. For example, as hardware capabilities improve, software often needs to change to accommodate new hardware requirements. Similarly, as software becomes more demanding, a similar effect occurs that can push hardware capabilities into new ground. In addition to these reciprocating forces, end-users continue to demand that software and hardware add convenience by improving automation of certain tasks or features, or by adding automation where none previously existed.

Recent developments in both software and hardware capabilities have involved the increasing use of multiple different processing units in the same computer system. Although personal computers have included multiple specialized processing units for some time now, such as the use of multiple video or audio processors in addition to the central processing unit (CPU), computers with multiple CPUs have heretofore tended to be limited to large, expensive server systems. One reason for this is that processors tend to be one of the most expensive components on a computer system, and the use of multiple CPUs has been fairly cost prohibitive for many or most common personal computer systems.

As the ratio of cost to processing capability has improved for CPUs, however, consumers are increasingly selecting computer systems that have multiple central processing units. Unfortunately, having multiple processors in a computer does not necessarily mean that the computer system will be faster or operate more efficiently. Specifically, the operating systems and applications used in such systems need also to be configured to use the multiple CPUs, and this is often done by specific assignment. For example, assuming an application program is built to use multiple CPUs in the first place, the developer will often have configured the application program so that the application executes certain tasks on one CPU, and then executes other tasks on another CPU, and so on.

At the outset, therefore, one will appreciate that these types of applications or components built with specific CPU assignments tend to have had fairly limited use. That is, applications or components built for multiple processors using explicit processor assignments often have difficulty operating (or are inoperable) in single processor environments, or in environments where the end user may have subsequently reduced or added to the number of processors in the system. Although a developer might be able to change or update the given software to match changes in the numbers of CPUs, there is usually some overhead associated with such changes.

Furthermore, these specific assignments may even prohibit some applications or components from actually gaining the benefits of a multiple processor environment, even where appropriately configured. Specifically, it can be difficult to anticipate exactly what each given CPU's workload will be during execution, and so the CPU assignments may not always be optimal. For example, if the application or component is configured to designate a first CPU during execution, and the first CPU is already heavily tasked, the one CPU might process its assigned tasks at a sub-optimal rate while another CPU might sit idly by.

Other types of configurations might use a more dynamic task assignment configuration among multiple processors. For example, the developer might configure the application or component so that application threads on CPUs that become idle during execution effectively "steal" tasks from other threads on other CPUs that may be overloaded. While this can help balance the load among threads executing on different CPUs on a task-by-task basis, these types of configurations do not ordinarily address how to handle particularly large or complex tasks. That is, simply stealing the task from one thread of one CPU to the next thread of the next CPU may not necessarily process the task faster. In addition, conventional systems are not ordinarily configured to steal only portions of a task at a time due to the significant chance of inconsistencies.

Accordingly, there are a number of difficulties associated with flexibly and efficiently executing tasks in multi-processor environments that can be addressed.

BRIEF SUMMARY

Implementations of the present invention overcome one or more problems in the art with systems, methods, and computer program products configured to dynamically balance the execution of tasks (and portions of tasks) in a multi-processor environment. In one implementation, for example, a developer can declare one or more tasks requested by an application as being "replicable" (or "replicable tasks"). During execution, any number of threads at a corresponding number of CPUs can then simultaneously process all or portions of a replicable task on another CPU. Implementations of the present invention further ensure synchronization of all portions of the replicable task while each thread executes the replicable task (or relevant portion). As such, applications can be configured to always use whatever resources are available in the most efficient possible way.

For example, a method in accordance with an implementation of the present invention of dynamically executing one or more tasks among a plurality of central processing units as available can involve receiving a request to execute one or more tasks from one or more applications. In this case, at least one of the one or more tasks is replicable. The method can also involve generating an original worker thread and one or more different worker threads for the request. Each generated worker thread is executed on one of a plurality of central processing units in the computerized system. In addition, the method can involve copying the at least one replicable task from the original worker thread to one or more different worker threads before execution of the replicable task has completed. Furthermore, the method can involve processing the at least one replicable task by a plurality of worker threads at the same time.

In addition to the foregoing, an additional or alternative method in accordance with the present invention for synchronizing processing of a task by multiple threads can involve assigning a plurality of worker threads to a plurality of different central processing units. The method can also involve identifying an original worker thread assigned to execute one or more pending replicable tasks. In addition, the method can involve identifying one or more different worker threads that have capacity to execute one or more additional tasks. Furthermore, the method can involve updating one or more values of a synchronizing component when the original worker thread and any of the one or more different worker threads process at least a portion of the replicable task on a different central processing unit.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Implementations of the present invention extend to systems, methods, and computer program products configured to dynamically balance the execution of tasks (and portions of tasks) in a multi-processor environment. In one implementation, for example, a developer can declare one or more tasks requested by an application as being "replicable" (or "replicable tasks"). During execution, any number of threads at a corresponding number of CPUs can then simultaneously process all or portions of a replicable task on another CPU. Implementations of the present invention further ensure synchronization of all portions of the replicable task while each thread executes the replicable task (or relevant portion).

Accordingly, and as understood more fully herein, implementations of the present invention can provide these and other advantages through one or more libraries configured to dynamically assign task processing. To this end, at least one implementation of the present invention includes one or more libraries that can be used by one or more different application programs. When a given application program requests processing of one or more tasks, therefore, the library can initiate one or more worker threads for any of one or more sets of tasks, albeit no more than one worker thread per central processing unit (CPU, also referred to generally herein as "processor"). During execution, worker threads that become idle can then copy and process pending tasks that are replicable (also referred to as "replicatable") to aid processing in addition to (or in lieu of) processing by any worker thread(s) that may be overloaded or busy.

Figure 1:
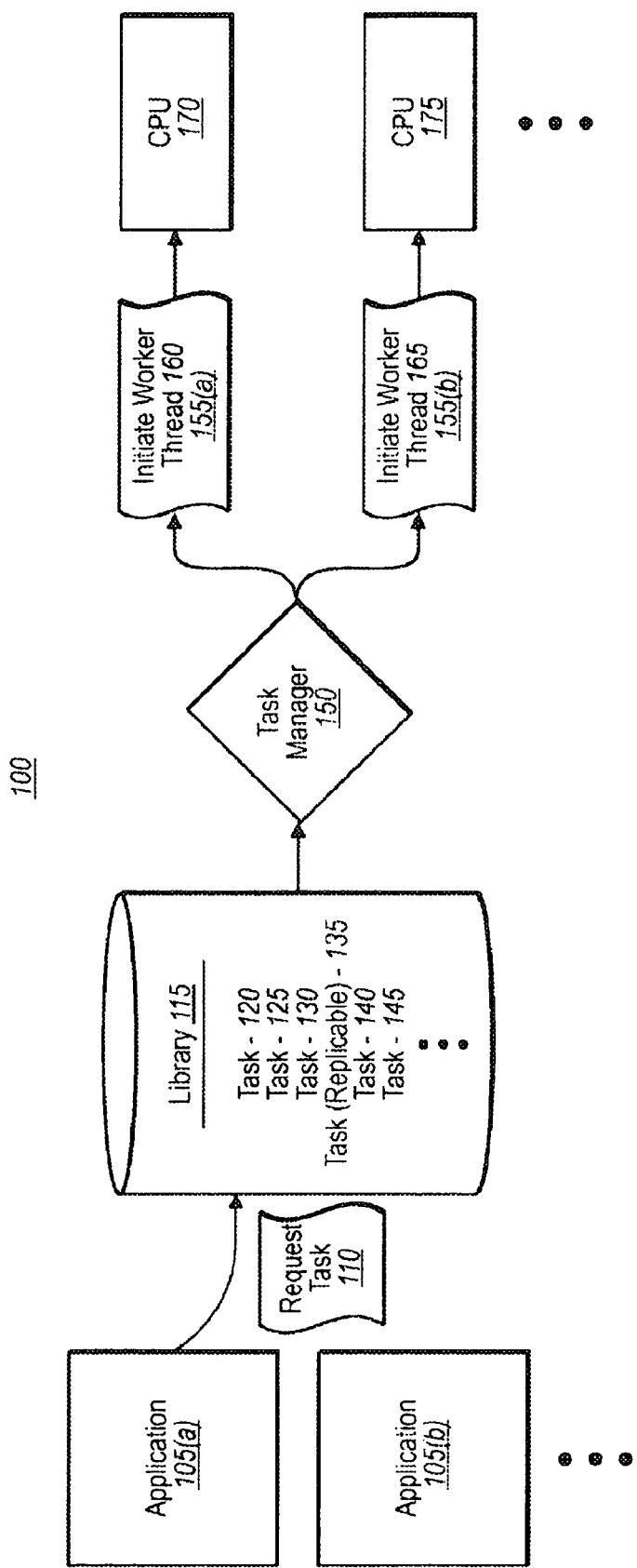
FIG. 1 illustrates an overview schematic diagram in accordance with an implementation of the present invention in which one or more applications implement tasks in parallel on multiple processors through a library.

As such, the library dynamically adapts processing to different workloads and architectures, and allows a number of different applications or components to take advantage of the benefits of parallel processing, when available. That is, the library and related components described herein are easily applied not only in existing and future systems that may continually employ additional processors, but also in prior systems where only one processor may be available. Specifically, the library and related components can be configured so that, on single processor machines, the performance will still be close (or identical) to the performance of otherwise sequential code. The library and corresponding mechanisms, described herein, therefore, can be deployed widely, and are easily adapted to provide efficiency regardless of whether there is only one CPU, or even a large number of different CPUs, or even if the number of CPUs in the system are subject to future change FIG. 1 illustrates an overview schematic diagram of a system 100 in accordance with an implementation of the present invention. In this case, FIG. 1 illustrates that one or more applications are configured to implement parallel tasks on multiple processors through a library. For example, FIG. 1 shows that system 100 comprises applications 105(a/b). In general, an "application," as used herein can comprise virtually any set of executable instructions, ranging from relatively simple components or modules to relatively complex database and operating systems and related components. For the purposes of description here, each of these is referred to herein generally as an "application 105."

FIG. 1 also shows that the applications 105 implement one or more libraries 115. As understood more fully herein, each library 115 comprises one or more sets of executable instructions for managing the execution of one or more "tasks" requested by each given application 105. For example, FIG. 1 shows that library 115 comprises a repository for (or relationship to) at least tasks 120, 125, 130, 135, 140, and 145, etc. As a matter of practice in at least one implementation, however, library 115 can deal with hundreds of thousands of various tasks at a time. Thus, the relatively few tasks shown or described herein are by way primarily of convenience in description.

A "task," in turn, can be understood in at least one implementation as the basic building block of a library 115 used by the other application 105 classes. As used herein, a task represents a computation that can potentially be done in parallel (i.e., executed through multiple different processors). In one implementation, a task is constructed by passing an "action delegate" that is executed by a "task object." This can sometimes be referred to herein as the "associated action" of a task. In addition, tasks can be thought of as having a parent/child relation, wherein the children of a task are all the tasks created in its associated action, including the children of those tasks, and so forth. In general, the associated action of a task can be executed in parallel on a different thread (or "worker thread") than the thread that created the task. Furthermore, tasks as used herein can be generally thought of as "first-class" values that can be stored in data structures, passed as parameters, and can be nested. This is in contrast to strict fork/join parallelism as in other operating systems, where one must join on a created task within its lexical scope.

By way of explanation, a task can also be thought to comprise a "future." In general, a "future" is a "task" that computes a result. A future is typically constructed not with a normal action, but with an action that returns a result: such as a delegate with the "Func<T>" type, where "T" is the type of the future value. In at least one implementation, the system 100 can retrieve the result of the future through the "value" property. In at least one implementation, the value property calls a "join" component internally to ensure that the task has completed, and that the result of the value has been computed. In contrast with conventional definitions for a "future," one will appreciate that "futures" used in the context of the present invention are not "safe," meaning that the programmer is responsible for properly locking shared memory (i.e., rather than wrapping the action of a future in a memory transaction). In at least one implementation, one will appreciate that the abstraction of a "future" can be configured to work well with symbolic code that is less structured than loops.

Furthermore, each of the above-mentioned tasks and futures can be configured to be "replicable," or comprising a "replicable task" (e.g., 135). In general, and as will be understood more fully herein, a replicable task (e.g., 135) can be understood as representing a task that can be executed by multiple different threads/worker threads on corresponding different processors at the same time. In at least one implementation, a replicable task captures the ubiquitous apply-to-all concurrency pattern while abstracting from the dynamics of work distribution. The constructor takes an action delegate that is potentially executed in parallel on another worker thread, and potentially executed by multiple threads at the same time. If an exception is raised in any of those executions, only one of them is stored and re-thrown by a "join." In at least one implementation, therefore, a replicable task can be used if other threads can potentially participate in the work.

Similarly, a "replicable future" can be understood herein as a replicable task (e.g., 135) that is configured to return a result. Since the work of a future can potentially be executed by multiple worker threads, the constructor takes a function such as "combine" in order to combine results of multiple different worker threads. Replicable futures can be seen as an unstructured variant of a "map-reduce pattern."

Referring again to the Figures, FIG. 1 shows that library 115 manages execution of the various tasks/futures (120, 125, 130, 135, 140, etc.) that might be requested by any given application 105. Often times, these various tasks/futures can be related, and may comprise a set of various tasks that are part of a request from an application 105. Thus, when the library 115 implements processing of the given tasks, library 115 can do so as part of one or more threads that are assigned to a given CPU. Notably, a developer of an application 105 or library 115 need not specify which CPU or thread for executing a particular task. Rather, library 115 can make an initial assignment, which itself may be subject to fluctuations based on CPU loads during execution.

For example, FIG. 1 illustrates that application 105(*a*) requests processing of one or more tasks via message 110. Library 115 then initiates or calls one or more task managers 150 to initiate or complete the various processing requests (e.g., message 110). Generally, the task manager 150 manages processing of the request tasks, and oversees worker threads (e.g., 160,165) that are used to execute the requested tasks. For example, FIG. 1 shows that task manager 150 initiates worker thread 160 via message 155(*a*), and initiates worker thread 165 via message 155(*b*). By way of further explanation, at least one implementation of task manager 150 comprises an associated concurrency level that can be identified. This concurrency level can be understood in at least one implementation as the maximal number of worker threads that are executing tasks at a given time.

Thus, when library 115 initiates task manager 150 (e.g., via a "task manager constructor," not shown), library 115 can supply the maximum number of threads to be used as one of its arguments. For example, system 100 might use five or more processors, and, as such, library 115 may request that task manager 150 implement processing only on two of the processors. In other cases, however, library 115 might not supply the number of processors, which can result in a default value. For example under the previous scenario, if library 115 does not specify the number of processors to use, task manager 150 may use as many as all five of the CPUs in system 100 at any given time. In additional or alternative implementations, library 115 can also specify the maximal stack size (e.g., 1MB) used for threads executing tasks.

In general, and in at least one implementation, there may be a default task manager (e.g., 150) available for any given application 105. Usually, only one task manager works best for most application 105 requests. Sometimes, however, one might want to use multiple task managers 150 that each have a different concurrency level, or where each handles separate task sets. In that case, one can create a new task manager, and use a specialized task constructor (not shown). This specialized task constructor can be configured to take a task manager as its first argument, and execute that task and its children using the requested task manager.

Referring again to the Figures, FIG. 1 shows that the task manager 150 in this case initiates one worker thread per processor, such as previously described. For example, FIG. 1 shows that task manager 150 initiates worker thread 160 to be processed via (or assigned to) CPU 170, and worker thread 165 to be processed via (or assigned to) CPU 175. Although any given replicable task that is being executed by a given worker thread can be processed from one thread to the next (or multiple threads at a time), there is generally a one-to-one relationship between initiated/constructed worker threads 160/165 and processors 170/175. As understood more fully below, the task manager 150 is configured to dynamically manage execution of various tasks between each given thread, and thus each given processor.

Figure 2A:
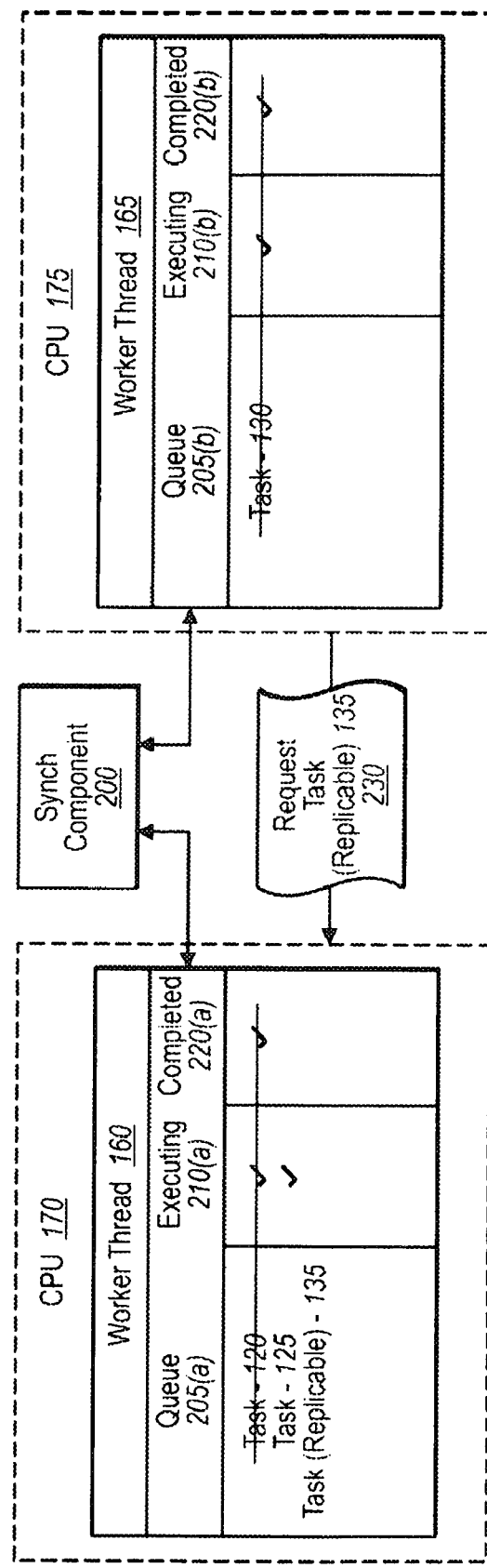
FIG. 2A illustrates a schematic diagram in accordance with an implementation of the present invention in which an idle worker thread requests a copy of a replicable task from another worker thread.

FIG. 2A illustrates additional details along these lines, showing a schematic diagram in which a plurality of worker threads execute tasks in parallel. For example, the request 110 by application 105 in this case involves execution of tasks 120, 125, 130, and 135, where at least one of these tasks is replicable (135). In this example, FIG. 2A shows that task manager 150 has assigned worker thread 160 to process task 120, task 125, and task 135, while assigning worker thread 165 only to process task 130. To manage processing of each task, FIG. 2A shows that each worker thread 160 is configured with a queue (205a/b) to designate pending tasks, and can be further configured to identify tasks that have a status of "executing" (210a/b) and "completed" (220a/b).

In short, there are a number of ways that task manager 150 might divide up these various tasks so that they can be executed efficiently through each of the processors 170, 175, etc. that are available. For example, task manager 150 might assign tasks to various worker threads 165 based on the size or complexity of the task, the number of tasks in the total request 110, and/or how related each task in a given thread is to the next task in a given sequence (i.e., groupings of tasks). However assigned, one will appreciate that there may be some worker threads 160/165 that finish processing before others, and thus become idle (i.e., the corresponding CPU 170/175 is idle).

Rather than being limited to the originally-assigned tasks, and/or remaining idle, each worker thread can be configured to start processing replicable tasks from other worker threads. For example, FIG. 2A shows that worker thread 165 has finished processing its assigned task 130, and is thus at least temporarily idle. FIG. 2A further shows that worker thread 160 has finished processing task 120, but continues to process task 125. This means that task 135 (which is replicable) remains "pending," or in the queue 205(a) for future processing. Since task 135 is replicable, worker thread 165 can process task 135 in lieu of (or in conjunction with) worker thread 160, and thereby remain busy while relieving the burden (or at least part of the burden) from worker thread 160. Accordingly, FIG. 2A shows that worker thread 165 passes message 230 to receive a copy of task 135.

Figure 2B:
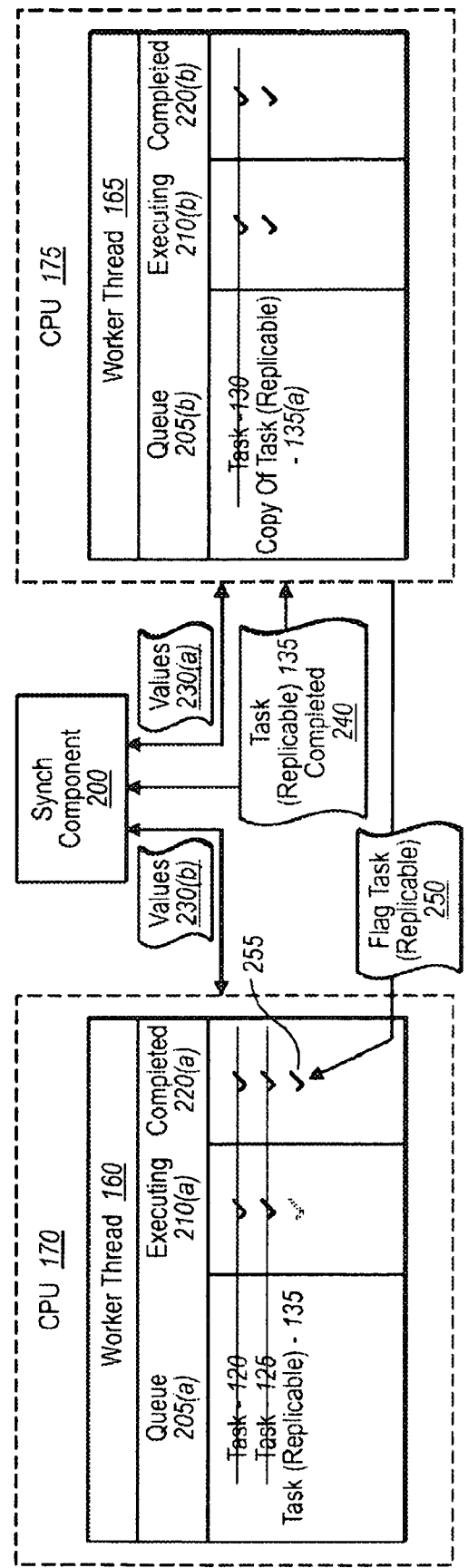
FIG. 2B illustrates the schematic diagram of FIG. 2A in which the worker threads share processing of replicable tasks through synchronization, in accordance with an implementation of the present invention.

As shown in FIG. 2B, worker thread 165 can then process a copy of replicable task 135 (i.e., task 135(a)). In at least one implementation, this involves placing task 135(a) in queue 205(b). Worker thread 165 can then execute task 135(a) through CPU 175, causing worker thread 165 to designate the task 135(a) as "executing" (210(b)) and ultimately as "completed" (220(b)). In general, a replicable task will often have several sub-task/children that can be completed by multiple different worker threads (e.g., 165, etc.) at a time. Thus, worker thread 165 may begin processing each portion or sub-task of replicable task 135(a). Then, once the original worker thread 160 finishes task 125, worker thread 160 might start processing other sub-tasks/children of the original replicable task 135. In either case, however, one will appreciate that any given original (160) or new/different (165) worker thread will only process one task (replicable or otherwise) at a time.

In addition, one will appreciate that since there is a possibility that a replicable task can be processed by multiple different worker threads (160, 165, etc.) at a time, synchronizing the various processing results is important. Accordingly, FIG. 2B further shows that implementations of the present invention also comprise one or more synchronizing components 200. In general, the synchronizing component 200 comprises a data structure to which any or all of the given sets of tasks can be linked. More particularly, each replicable task that is handled by any other worker threads in the system will have some relationship or link through the synchronizing component 200.

In general, the synchronizing component 200 can comprise a wide range of different data structures to which one or more copies of a replicable task can be linked and otherwise reference. In at least one implementation, for example, synchronizing component 200 comprises an index that is shared or linked to each sub-task/sub-component of a replicable task 135. Thus, FIG. 2B shows that any change in values can be relayed and retrieved by any worker thread through the synchronizing component 200. For example, FIG. 2B shows that worker thread 165 sends one or more values 230(a) in one or more messages to the synchronizing component 200. Similarly, once the original worker thread 160 finishes processing task 125, worker thread 160 also relays its processing results for replicable task 135 through synchronizing component 200.

In at least one implementation, this relay of values 230(a), 230(b) can comprise one or more requests to update the synchronization component and/or retrieve a value. For example, prior to initiating execution of the copy 135a of replicable task 135, worker thread 165 updates a counter in the synchronizing component 200 to indicate that it has taken and begun processing the first portion of replicable task 135. Worker thread 165 can also decrement another counter, which can tell other worker threads how many portions of the replicable task are left to be taken. Then, once worker thread 160 finishes processing task 125, worker thread 160 will then update the counter to indicate that it has taken and begun processing the next component (e.g., the second portion) of replicable task 135. As with worker thread 165, the original worker thread 160 can also further decrement another counter. Thus, any worker thread 160, 165, etc. in the system 100 can continue to process portions of replicable task 135 until all counters within synchronizing component 200 have been updated and/or decremented to a maximum high or low value.

Once processing is finished for replicable task 135 by any or all worker threads, implementations of the present invention include still a further aspect for synchronization, in that the last worker thread to process a portion of the replicable task can flag the replicable task as being completed. For example, FIG. 2B shows that, upon completion of task 135 (a), worker thread 165 identifies via message 240 that it is the last worker thread to process an available portion of replicable task 135, and that replicable task 135 is complete. As such, worker thread 165 then passes one or more messages 240 to task manager 150 to explicitly flag (255) worker thread 160 to indicate that replicable task 135 has now been processed to completion. Upon being flagged, worker thread 160 can safely remove the replicable task 135 from the queue 205(a).

Figure 4:
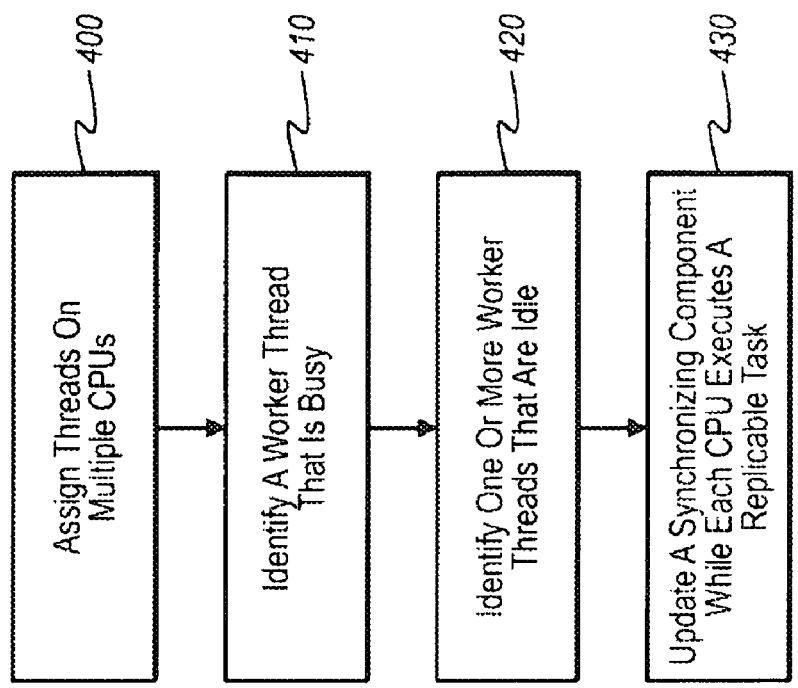
FIG. 4 illustrates a flowchart of a series of acts in a method in accordance with an implementation of the present invention of synchronizing execution of a replicable task by a plurality of CPUs.
Figure 3:
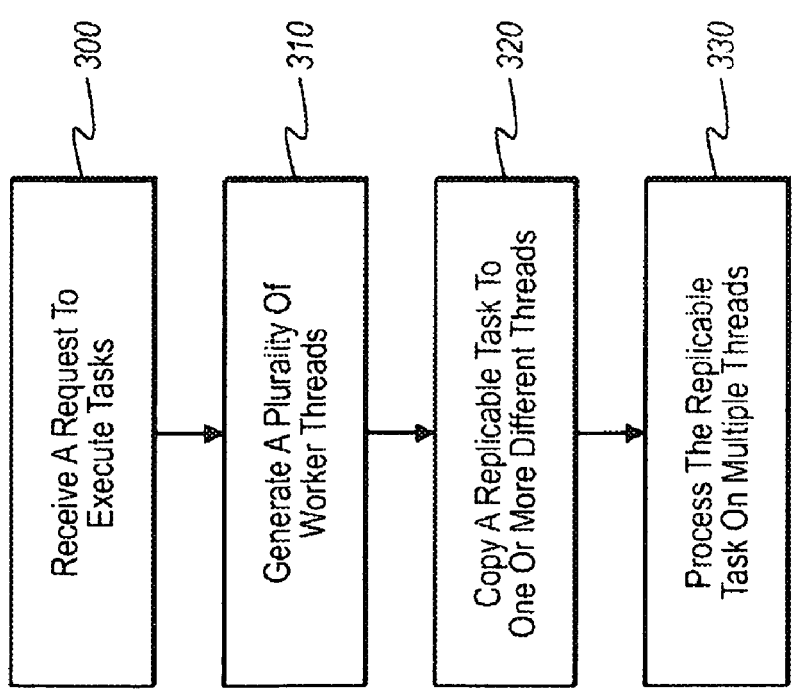
FIG. 3 illustrates a flow chart of a series of acts in a method in accordance with an implementation of the present invention of efficiently processing a replicable task by a plurality of CPUs.

Accordingly, FIGS. 1-2B provide a number of schematics and components for dynamically and efficiently assigning the processing of tasks among multiple different CPUs (i.e., threads assigned to those processors). In particular, implementations of the present invention include the ability to dynamically assign work among multiple different processors on an as-needed basis, and without losing any consistency guarantees. In addition to the foregoing, implementations of the present invention can also be described in terms of flowcharts comprising acts in a method for accomplishing a particular result. For example, FIGS. 3 and 4 illustrate a flow chart of a series of acts in alternative methods in accordance with an implementation of the present invention of executing tasks in parallel through dynamic CPU assignments, and in a synchronized manner. The acts of FIGS. 3 and 4 are discussed more fully below with respect to the schematics and components of FIGS. 1-2B.

For example, FIG. 3 shows that a method of consistently and dynamically processing tasks among multiple CPUs can comprise an act 300 of receiving a request to execute tasks. Act 300 includes receiving a request to execute one or more tasks from one or more applications, wherein at least one of the one or more tasks is replicable. For example, FIG. 1 shows that library 115 receives one or more requests 110 via one or more applications 105 to execute one or more tasks. FIG. 1 further shows that one or more of the tasks that are managed through library 115 include replicable task 135. As such, request 110 may include a specific call for the replicable task 135, or may include a call for one or more sets of tasks, which further include one or more replicable tasks within the grouping.

FIG. 3 also shows that the method can comprise an act 310 of generating a plurality of worker threads. Act 310 includes generating an original worker thread (160) and one or more different worker threads for the request, wherein each generated worker thread is executed on one of a plurality of central processing units in the computerized system. For example, FIG. 1 shows that, in response to request 110, library 115 constructs or otherwise initiates task manager 150. Task manager 150, in turn, initiates worker threads 160 and 165, which will be processed on separate CPUs 170, 175, respectively. In this case, worker thread 160 holds an original assignment for replicable task 135, and is thus the "original worker thread" for purposes of this discussion.

In addition, FIG. 3 shows that the method can comprise an act 320 of copying a replicable task to a different thread. Act 320 includes copying the at least one replicable task from the original worker thread to one or more different worker threads before execution of the replicable task has completed. For example, as shown in FIG. 2A, worker thread 165 becomes idle after processing task 130. Worker thread 165 then identifies that task 135 is replicable, and furthermore, is still pending in queue 205(a) at worker thread 160. Accordingly, worker thread 165 sends one or more requests 230 to copy replicable task 135 to worker thread 165.

Furthermore, FIG. 3 shows that the method can comprise an act 330 of processing the replicable task in multiple threads. Act 330 includes processing the at least one replicable task by a plurality of worker threads at the same time. For example, FIGS. 2A and 2B show that worker threads 160 and 165 (i.e., one of the "different worker threads") can refer to one or more synchronizing components 200, which may be shared between one or more of the tasks being processed. Thus, as shown in FIG. 2B, while processing task 135(a), worker thread 165 can continually communicate (e.g., via messages with values 230(a)) with synchronizing component 200. During this time, worker thread 160 may also begin processing replicable task 135, and thus also communicate the various values 230(b) with synchronizing component 200.

In addition to the foregoing, FIG. 4 illustrates that an additional or alternative method for consistently and dynamically processing tasks among multiple CPUs can comprise an act 400 of assigning threads on multiple CPUs. Act 400 includes assigning a plurality of worker threads to a plurality of different central processing units. For example, FIG. 1 shows that, upon receiving one or more task requests 110, library 115 (via task manager 150) creates and assigns at least worker threads 160 and 165 to at least CPUs 170 and 175, respectively.

FIG. 4 also shows that the method can comprise an act 410 of identifying one or more worker threads that are busy. Act 410 includes identifying an original worker thread assigned to execute one or more pending replicable tasks. For example, FIG. 2A shows that worker thread 160 is assigned to execute tasks 120, 125, and 135, of which task 135 is replicable. Thus, for the purposes of this discussion, worker thread 160 is the original worker thread with respect to replicable task 135.

In addition, FIG. 4 shows that the method can comprise an act 420 of identifying one or more worker threads that are idle. Act 420 includes identifying one or more different worker threads that have capacity to execute one or more additional tasks. For example, FIG. 2A shows that worker thread 165 has finished processing task 130, and thus identifies that it has capacity to perform additional tasks. In at least one implementation, this further involves worker thread 165 performing one or more queries to find out if any of the other worker threads in the system have any tasks that are replicable (e.g., 135).

Furthermore, FIG. 4 shows that the method can comprise an act 430 of updating a synchronizing component while each CPU executes a replicable task. Act 430 includes updating one or more values of a synchronizing component when the original worker thread and any of the one or more different worker threads process at least a portion of the replicable task on a different central processing unit. For example, FIG. 2B shows that worker threads 160 and 165 communicate with synchronizing component 200 to identify (e.g., via message 240) each time processing has been completed on at least a portion of the replicable task 135. Upon completion of all portions, FIG. 2B shows that the last worker thread (i.e., 165) sends one or more messages 250 to the original worker thread (i.e., 160) in order to explicitly flag (e.g., 255) task 135, and thus identify this task as completed.

Accordingly, FIGS. 1-4 provide a number of schematics, components, and mechanisms for efficiently and dynamically processing tasks in a computerized system. Due to the dynamic assignment capabilities, the principles described herein can be applied to a wide number of computing systems, including those with only a single processor, as well as those with multiple processors, and even changing processors (e.g., due to hardware upgrades). Furthermore, implementations of the present invention allow for improved processing efficiency by providing ways for many different processors (i.e., via threads executing on multiple processors) to process tasks with a relatively high degree of granularity, without losing any consistency guarantees. This is true at least in part since multiple processors can now process even single portions of a task at a time. Accordingly, implementations of the present invention represent a number of advantages over, for example, conventional CPU/task assignment schemes, as well as even more dynamic "work stealing" schemes.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computer system comprising a plurality of central processing units (CPUs) and wherein one or more applications are configured to request execution of one or more tasks maintained in one or more libraries, a method of using a plurality of worker threads that are assigned to execute on different CPUs to execute at least some of the one or more tasks in parallel comprising the acts of:
   receiving from one or more applications a request to execute a plurality of tasks;
   assigning to each CPU at least one worker thread for processing, each worker thread having a queue for tracking execution and completion of an assigned task;
   assigning one or more tasks from one or more applications to each of the at least one worker thread assigned to each CPU, wherein at least one of the one or more assigned tasks is replicable;
   if a worker thread has a replicable task originally assigned to its queue, designating that worker thread as an original worker thread for the replicable task; and
   each worker thread using its queue to determine when its assigned tasks are completed, and when a first worker thread has completed its assigned tasks, the first worker thread copying an uncompleted replicable task from an original worker thread and commencing processing of uncompleted portions of the copied replicable task, and then when a second worker thread completes its assigned tasks, the second worker thread also copying the same replicable task from the original worker thread and processing other uncompleted portions of the copied replicable task not yet processed by the first worker thread.

2. The method as recited in claim 1, further comprising an act of a library instantiating a task manager to handle the request, wherein the task manager generates the plurality of worker threads and assigns at least one worker thread to each CPU.

3. The method as recited in claim 2, wherein the task manager maintains execution of all tasks that do not include a replicable task on one worker thread at a time.

4. The method as recited in claim 2, further comprising an act of the library designating a number of central processing units to be used by the task manager.

5. The method as recited in claim 2, further comprising an act of the task manager dynamically determining the number of worker threads to be generated based on the number of central processing units in the system.

6. The method as recited in claim 1, further comprising an act of each worker thread synchronizing those portions of a copied replicable task that have been processed through one or more synchronizing components linked to each copy of a replicable task.

7. The method as recited in claim 6, wherein the one or more synchronizing components comprise an index file that is shared by each copy of a replicable task.

8. The method as recited in claim 6, further comprising an act of one of the worker threads receiving an indication from a synchronizing component that all portions of a replicable task have been processed.

9. The method as recited in claim 8, further comprising an act of a worker thread sending a message to the original worker thread that a replicable task has been processed to completion.

10. The method as recited in claim 6, wherein the act of synchronizing further comprises each of the worker threads that are processing a copied replicable task performing an act of updating a synchronizing component linked to the copied replicable task each time a portion of the replicable task has been processed.

11. The method as recited in claim 1 wherein the acts of the method are stored on a computer readable medium which is comprised of a computer storage device having physical memory that stores executable instructions thereon, which, when executed, cause the CPUs of the computer system to implement the method.

12. In a computer system comprising a plurality of central processing units (CPUs) and wherein one or more applications are configured to request execution of one or more tasks maintained in one or more libraries, a method of using a plurality of worker threads that are assigned to execute on different CPUs to execute at least some of the one or more tasks in parallel, comprising the acts of:
   receiving from one or more applications a request to execute a plurality of tasks;
   assigning to each CPU at least one worker thread for processing, each worker thread having a queue for tracking execution and completion of an assigned task;
   assigning one or more tasks from one or more applications to each of the at least one worker thread assigned to each CPU, wherein at least one of the one or more assigned tasks is replicable;
   if a worker thread has a replicable task originally assigned to its queue, designating that worker thread as an original worker thread for the replicable task;
   each worker thread using its queue to determine when its assigned tasks are completed, and when a first worker thread has completed its assigned tasks, the first worker thread copying an uncompleted replicable task from an original worker thread and commencing processing of uncompleted portions of the copied replicable task, and then when a second worker thread completes its assigned tasks, the second worker thread also copying the same replicable task from the original worker thread and processing other uncompleted portions of the copied replicable task not yet processed by the first worker thread;
   each of the first and second worker threads which are processing portions of said same copied replicable task updating a synchronization component as to the portions of processing completed for the same copied replicable task, and if a worker thread determines that it has completed the last portion of a copied replicable task, in addition to updating the synchronization component, sending a message to the original worker thread for the completed replicable task indicating its completion; and once an original worker thread reaches a replicable task in its queue, the original worker thread first checking to determine whether the replicable task has been completed by any of the first and second worker threads that copied the replicable task, and if completed, the original worker thread moving to a next task in its queue, if any, and if the copied replicable task is not yet completed, the original worker thread then checking the synchronization component and processing one or more remaining portions of the replicable task which have not been completed and which are not already being processed by any other worker threads.

13. The method as recited in claim 12, wherein once a worker thread has completed the tasks in its queue, that worker thread identifies a replicable task that it can copy by checking the queue of one or more other worker threads, and by checking the synchronization component to determine that the identified replicable task still has portions thereof that require processing.

14. The method as recited in claim 12 wherein the acts of the method are stored on a computer readable medium which is comprised of a computer storage device having physical memory that stores executable instructions thereon, which, when executed, cause the CPUs of the computer system to implement the method.

\* \* \* \* \*